United States Patent [19]

Choi

[11] Patent Number: 5,722,701

[45] Date of Patent: Mar. 3, 1998

[54] METHOD AND ASSEMBLY FOR JOINING PIPES

[76] Inventor: Sang-min Choi, Hyundai Villa 203, 836-3, Jisan-dong, Songtan-si, Kyungki-do, Rep. of Korea

[21] Appl. No.: 753,997

[22] Filed: Dec. 4, 1996

[51] Int. Cl.⁶ .................................................. F16L 55/18
[52] U.S. Cl. ....................... 285/337; 285/294.1; 285/294.3
[58] Field of Search .................................... 283/337, 369, 283/284, 285, 292, 293, 294, 422

[56] References Cited

U.S. PATENT DOCUMENTS

| | | | |
|---|---|---|---|
| 410,816 | 9/1889 | Walker et al. | 285/294 |
| 494,147 | 3/1893 | Lloyd | 285/294 |
| 1,578,734 | 3/1926 | Hume | 285/292 |
| 2,156,604 | 5/1939 | Payne et al. | 285/294 |
| 2,180,695 | 11/1939 | Rembert | 285/292 |
| 2,751,236 | 6/1956 | Wyatt | 285/292 |
| 3,748,863 | 7/1973 | Pogonowski et al. | 285/294 |
| 3,989,281 | 11/1976 | Wilde, Jr. | 285/294 |
| 4,053,176 | 10/1977 | Hilbush | 285/294 |
| 4,326,735 | 4/1982 | Hunder et al. | 285/294 |
| 4,557,507 | 12/1985 | Commandeur et al. | 285/45 |

FOREIGN PATENT DOCUMENTS

| | | | |
|---|---|---|---|
| 790283 | 11/1935 | France | 285/294 |
| 898589 | 6/1962 | United Kingdom | 285/294 |

*Primary Examiner*—Eric K. Nicholson
*Attorney, Agent, or Firm*—Dvorak & Orum

[57] ABSTRACT

An assembly for joining pipes which completely prevents fluid from leaking from connections of pipes when they are joined, in which a seal member is wrapped around connections of pipes disposed longitudinally to one another, a watertight device is placed over this seal member, the watertight device having a pocket which contains alumina cement powder, and a clip is positioned on the outside of the watertight device, the clip fastening the pocket in a circumferential direction.

7 Claims, 6 Drawing Sheets

METHOD AND ASSEMBLY FOR JOINING PIPES

BACKGROUND

The present invention relates to a method for jointing pipes mainly used in sewage systems, drainage systems, agricultural and/or industrial water systems, water-drawing systems, etc. and the assembly thereof.

The pipes in the above systems, however, are difficult to manufacture without limits in length. Thus, multiple pipes with given lengths are usually used for designated purposes by joining to one another longitudinally or in a direction perpendicular to the longitudinal direction.

Referring to FIG. 9, there is shown an assembly by a conventional method for joining concrete pipes. FIG. 9A shows an assembly for joining pipes in which a socket portion is not formed, while an assembly for joining pipes with a socket portion is shown in FIG. 9B. The joining assembly shown in FIG. 9A is accomplished by a process of plastering resin mortar or cement mortar 104 over the joining portion after applying a lubricant on pipes 100 and 102 to be joined. When joining pipes with a socket portion as shown in FIG. 9B, the assembly is accomplished by a process in which material for gluing joints is applied around the inner peripheral surface of a socket portion 106 of a pipe 100, a rubber ring 110 is inserted on the inward side of the material, and a pipe 102 is inserted inwardly thereof.

However, the joining method illustrated in FIG. 9A poses a problem of deteriorating watertightness when the pipes sway because the applied cement mortar has no elasticity. The joining method illustrated in FIG. 9B deteriorates watertightness in which a gap forms when the pipes are not inserted completely.

SUMMARY

It is therefore an object of the present invention to overcome the above-described prior art drawbacks and to provide a method for joining pipes in a new manner, differing from methods of the prior art, and the assembly thereof.

More particularly, it is an object of the present invention to provide a method for joining pipes and the assembly thereof, in which work for joining pipes can be easily done, watertightness is improved, and pipes can be joined at a desired angle.

To achieve the above objects, the present invention provides a method for joining pipes, comprising the steps of longitudinally disposing pipes to be in contact with one another; wrapping a seal member around a pipe connection; placing watertight means over the seal member; filling alumina cement powder blended with water in a pocket of the watertight means; and fastening a clip outwardly on the watertight means.

An assembly of joining pipes according to the present invention using the above-mentioned method is provided with seal member wound outwardly on a connection of pipes disposed longitudinally in contact with one another, watertight means placed over on the seal member, the watertight means having a pocket in which alumina cement powder together with water is filled, and a clip tightening this pocket in a peripheral direction outwardly on the pocket.

BRIEF DESCRIPTION OF THE DRAWINGS

Further objects and other advantages of the present invention will become apparent from the following description in conjunction with the attached drawings, in which.

DESCRIPTION

Figure 1:
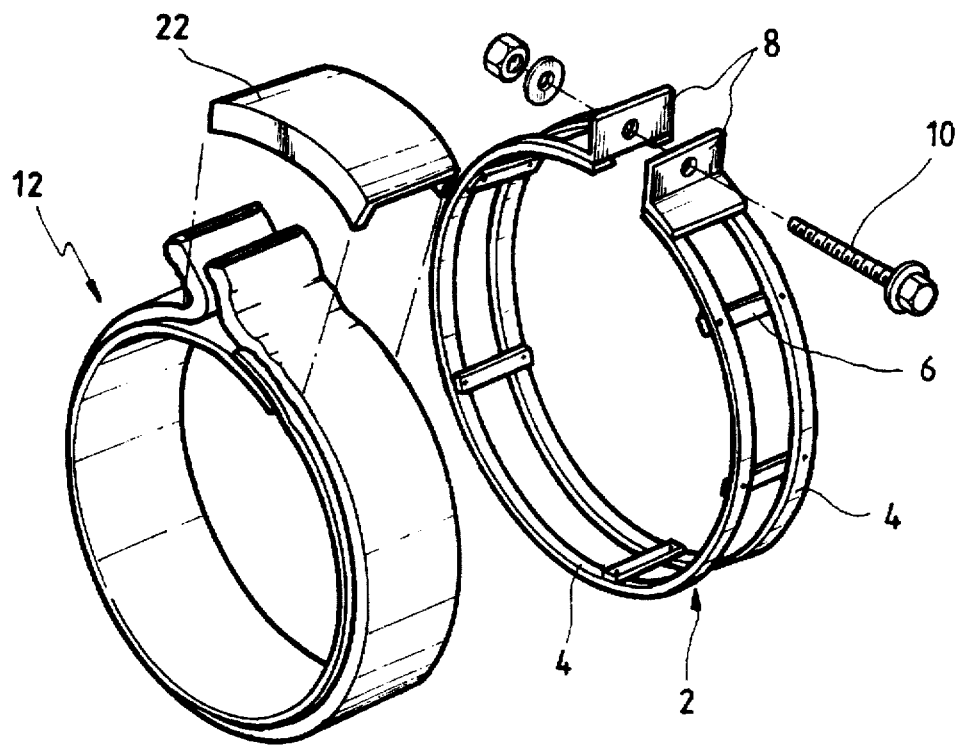
FIG. 1 is an exploded perspective view of an assembly for joining pipes relating to the present invention.
Figure 2:
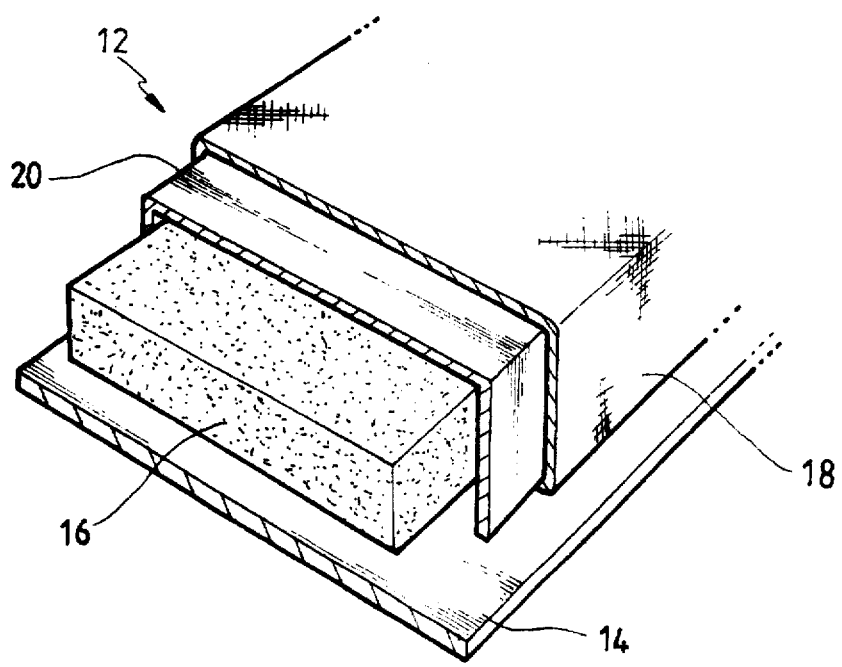
FIG. 2 is a perspective cutaway view illustrating watertight means of an assembly for joining pipes relating to the present invention.

Referring now to FIG. 1, there is shown a perspective view of an assembly for joining pipes in accordance with the present invention.

There is provided a clip 2 comprising two parallel loop-shaped bands 4 connected with each other by means of transverse members 6, the bands 4 being disposed in two rows, on both ends of which locking planes 8 are fixed.

The connection of the locking planes 8 to each other make the bands 4 to be in an arc shape, the internal diameter of which can be increased or decreased by means of the rotating degree of a screw 10 which penetrates both locking planes 8.

There is further provided a watertight device 12 placed over a pipe connection, the clip 2 is not limited to the above described structure, and any fastener can be used instead of the clip.

The watertight device comprise a seal member 14 wound on the outer surface of a concrete pipe connection, the seal member 14 being softened with heat, and a pocket 18 adhered to one side of the seal member 14, the pocket 18 being bound with the clip 2 in peripheral direction, containing alumina cement powder 16 discharging high-temperature heat and expanding both due to a chemical reaction with water.

Asphalt rubber which softens at high temperatures can be used for the seal member 14, and waterproof canvas can be used for the pocket 18, the waterproof canvas having pores which allow ventilation of air but disallows the passage of water.

The pocket 18 is inwardly provided with a channel member 20 such that the expansion of the alumina cement 16 by the chemical reaction with water can be totally transmitted toward the seal member 14.

This channel member 20 which integrally forms a circle is produced by press work in which a metallic sheet of 1 mm or more in thickness is shaped into three planes.

The channel member 20 is inserted in the pocket 18 such that the opening of the channel member 20 is directed toward the seal member 14.

Figure 3:
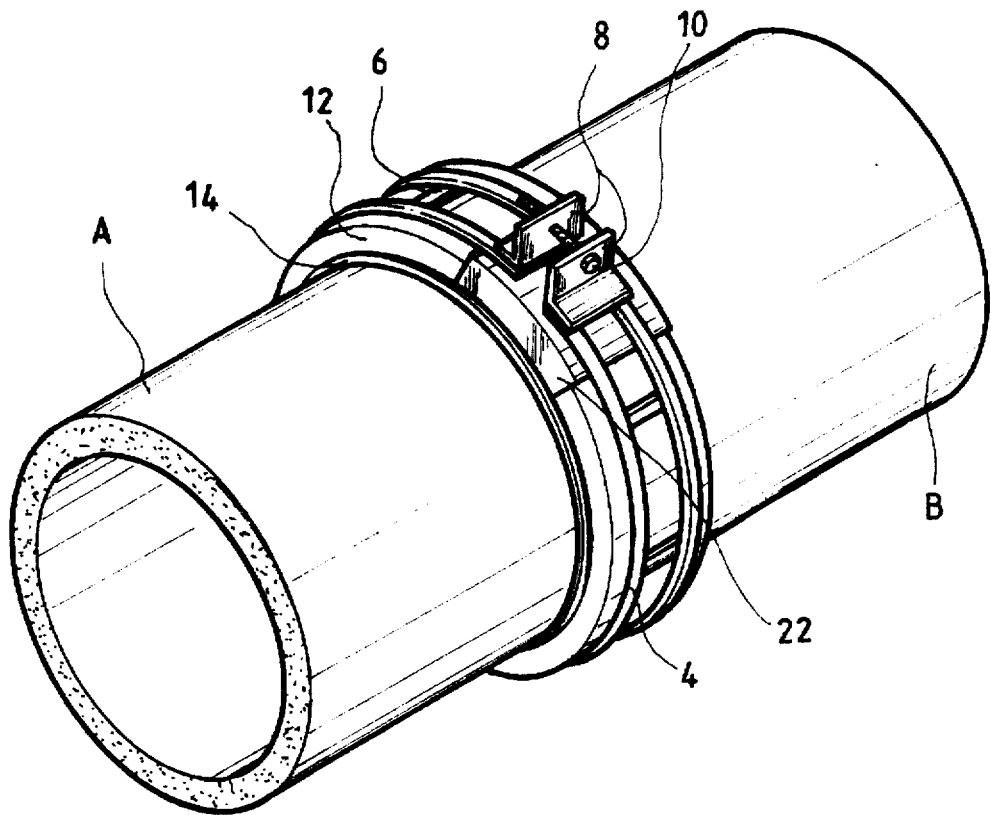
FIG. 3 is a perspective view illustrating pipes joined by an assembly for joining pipes in accordance with a preferred embodiment of the present invention.

FIG. 3 illustrates the present invention in a state where it is connected to two pipes A and B combined longitudinally. As shown in the drawing, the clip 2 is fastened outwardly on the watertight device 12 placed over the connection for the two concrete pipes A and B.

The above state is realized after steps of contacting the two concrete pipes longitudinally, winding the seal member 14 around this connection, and positioning watertight device 12 about the seal member 14.

The watertight device 12 can be placed over the seal member 14 by spreading both ends of the channel member 20 apart. This is possible since the watertight device 12 form a circle due to the circular shape of the metallic channel member 20 in the watertight device 12.

In this state, after blending alumina cement powder with water in a separate vessel, this compound is poured into the pocket 18 of the watertight device 12.

Then, the alumina cement powder and water compound expands by a chemical reaction, discharging high-temperature heat.

During the expansion of the alumina cement powder, the clip 2 in accordance with the present invention is placed over the watertight device 12, and the locking planes 8, fixed on both ends of the bands 4 are fastened together by means of a screw 10.

Through this structure, the expansion of the alumina cement powder is transmitted exclusively toward the opening of the channel member (i.e. toward the outer peripheral surface of the concrete pipes A and B) because the alumina cement powder 16 expanding with heat in the pocket 18 is surrounded by the metallic channel member 20 over which the clip 2 is fastened.

Figure 4:
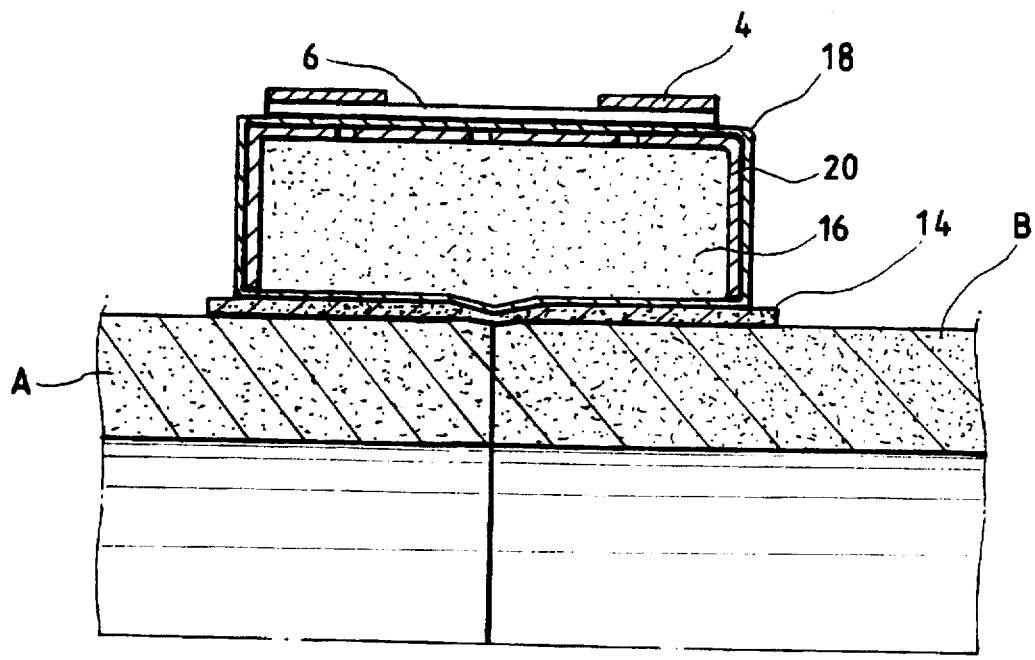
FIG. 4 is a sectional view illustrating pipes joined by an assembly for joining pipes in accordance with a preferred embodiment of the present invention.

Accordingly, the force of the pressure caused by the expansion is given to the outer surface of the seal member 14, and the seal member 14 nearly melts as a result of the alumina cement powder 16 discharging heat at approximately 90 degrees centigrade. Therefore, the seal member 14 fully seals the connection of concrete pipes A and B as shown in FIG. 4.

After a lapse of time, the alumina cement powder 16 hardens. It is possible to mix sand with the alumina cement powder 16 to increase the hardening thereof.

Because the entire circumference of the joining part of the pipes is covered in the above operation, water cannot leak from the connection of concrete pipes.

Figure 5:
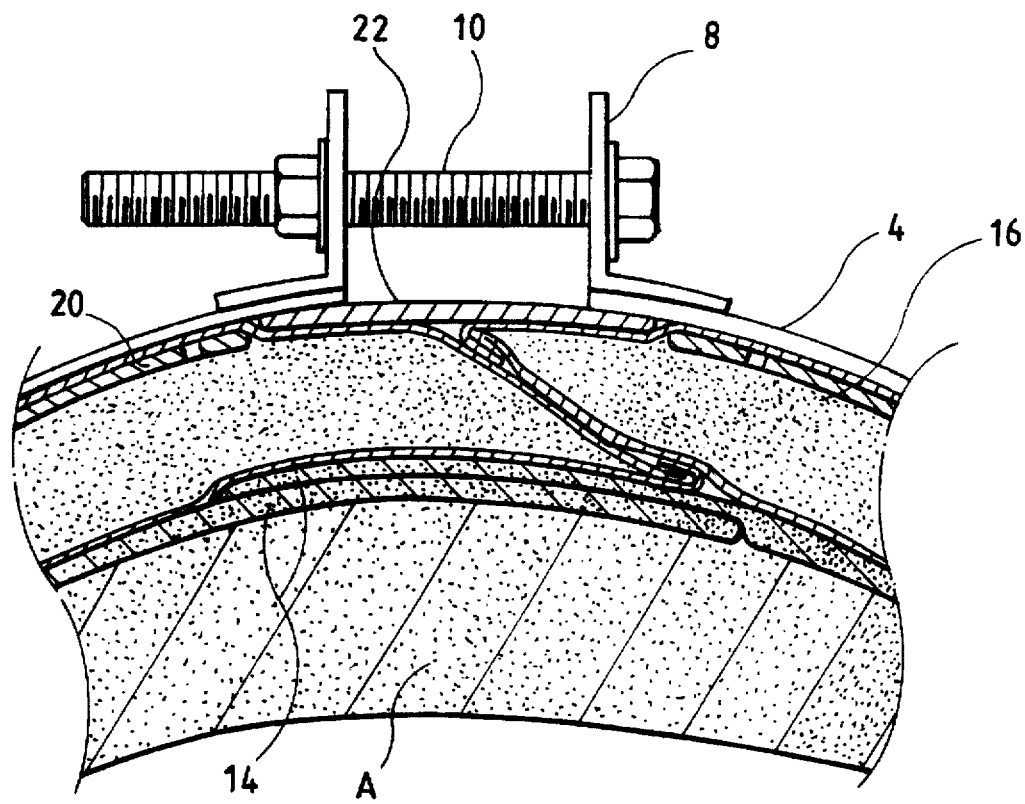
FIG. 5 is a sectional view of a connection of pipes joined by an assembly for joining pipes in accordance with a preferred embodiment of the present invention.

FIG. 5 illustrates a state in which the watertight device 12 is fastened by the clip 2, after both ends of the pocket 18 in the watertight device 12 are folded and put in contact with each other and a metal piece 22 is placed over the folded ends. This structure prevents the alumina cement powder 16 from flowing out through both ends of the pocket 18 during expansion.

Figure 6:
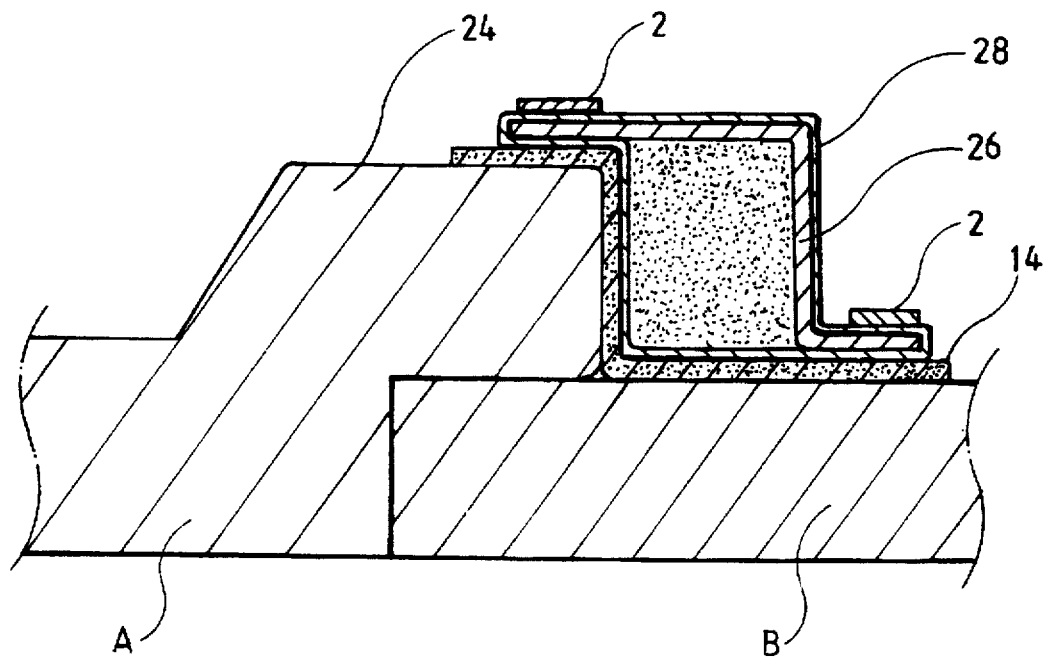
FIG. 6 is a sectional view illustrating pipes joined by an assembly for joining pipes in accordance with another preferred embodiment of the present invention.

Referring to FIG. 6, there is shown a sectional view illustrating pipes joined by an assembly for joining pipes in accordance with another preferred embodiment of the present invention, the assembly in this embodiment can be adopted when socket pipes are joined.

When joining socket pipes such that a pipe B is inserted in a socket portion 24 formed on a pipe A, a gap between the pipes A and B forms in the socket portion 24. In this embodiment, therefore, a crank type member 26 corresponding to the channel member 20 illustrated in the first preferred embodiment is inserted in a pocket 28.

Clips 2 fasten each periphery of the pocket 28 disposed respectively on the outside of the socket portion 24 and on the outside of the pipe B.

The method for joining pipes in this embodiment is identical to that in the first preferred embodiment except that the seal member 14 is placed on a connection of the pipes A and B formed in a crank shape.

In this case, the seal member 14 fuses the gap between the inner peripheral surface of the socket portion 24 and the outer peripheral surface of the pipe B during melting, thus realizing a sealed joint.

Figure 7:
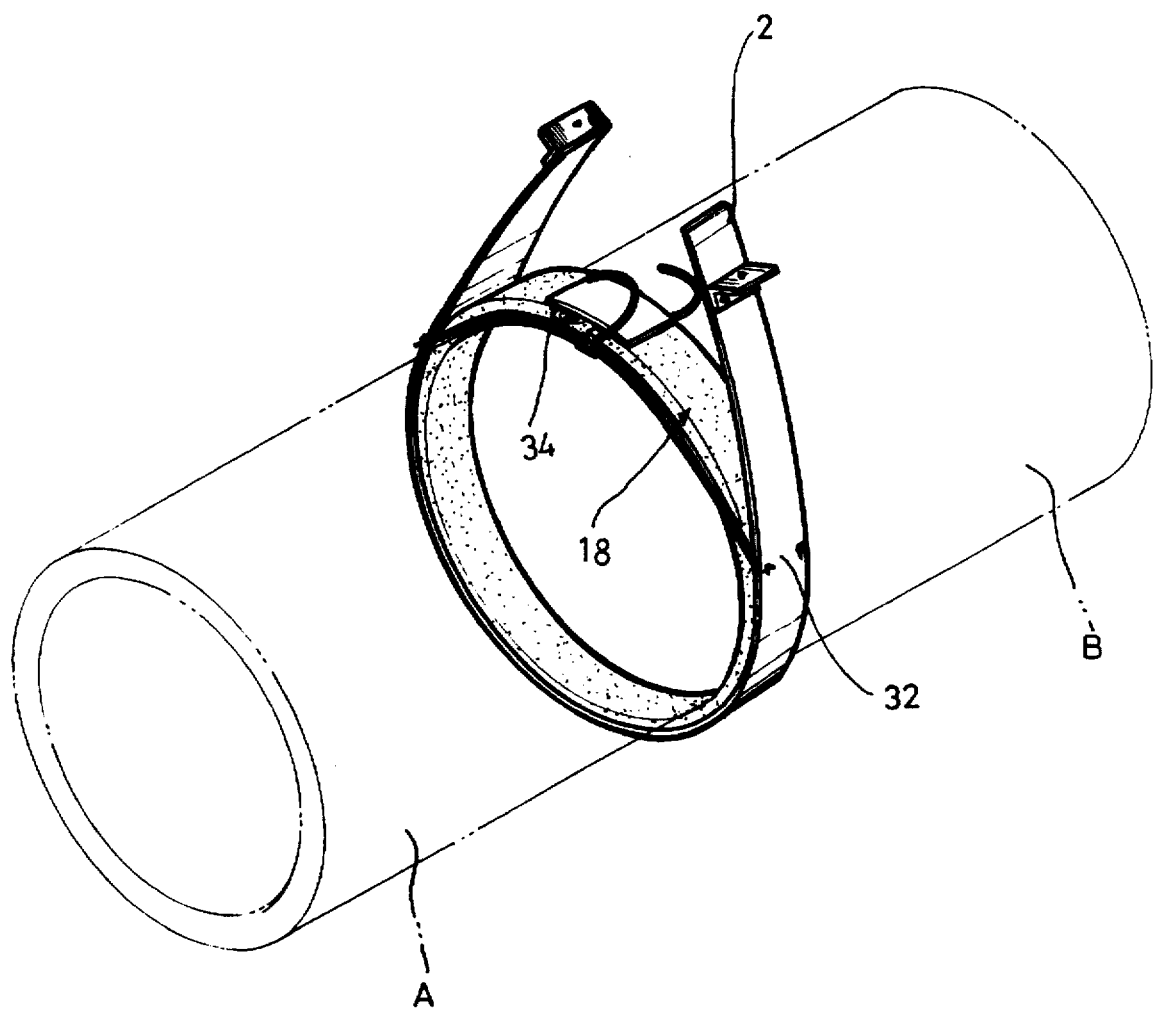
FIG. 7 is a perspective view illustrating an assembly for joining pipes in accordance with a yet another embodiment of the present invention.
Figure 8:
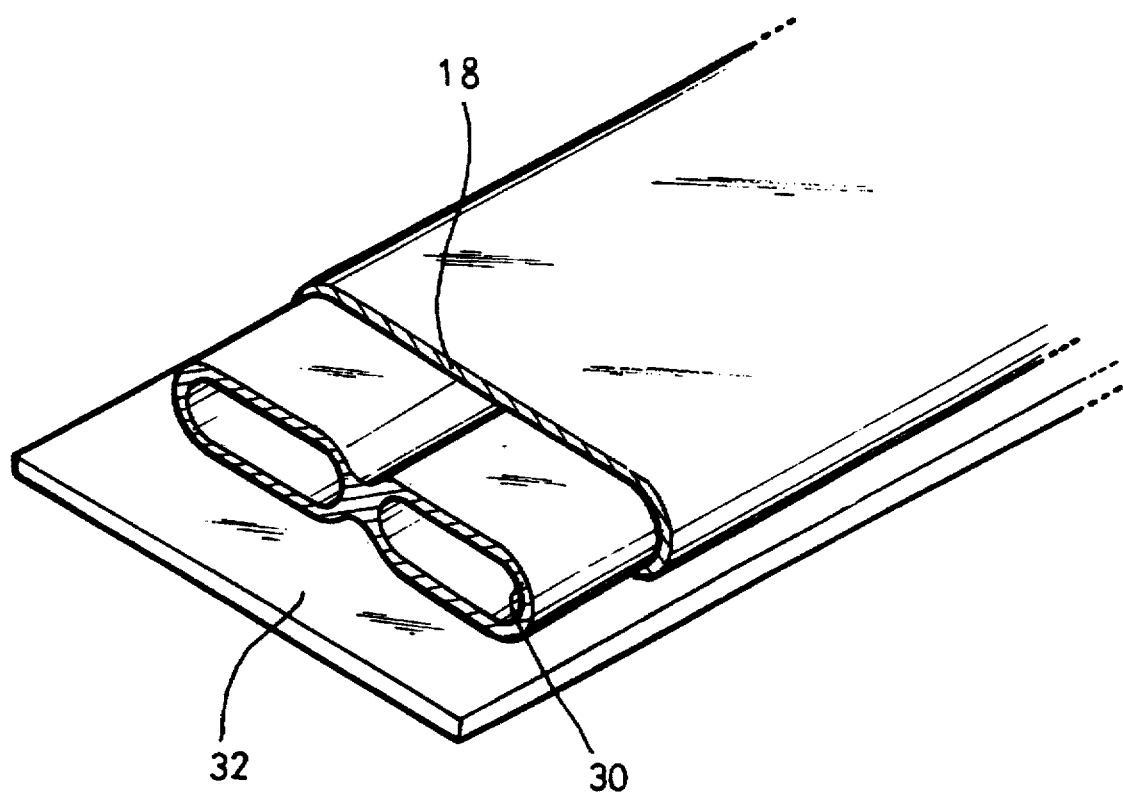
FIG. 8 is a sectional view of an assembly for joining pipes shown in FIG. 7.
Figure 9A:
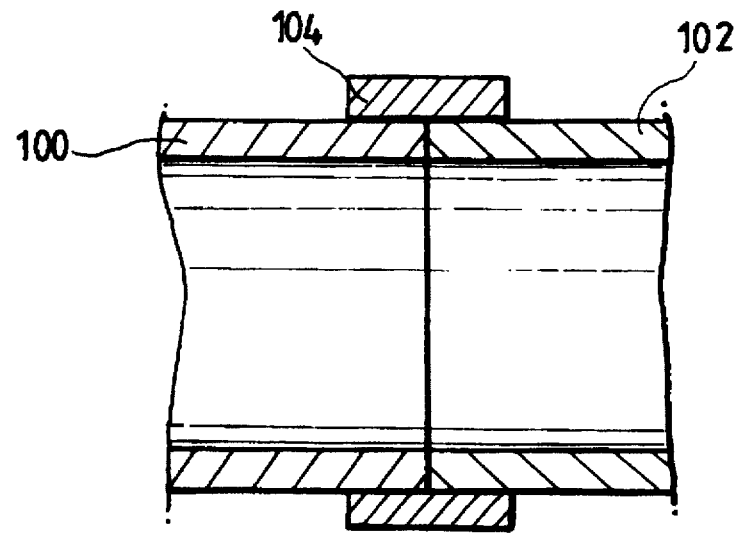
FIGS. 9A and 9B are views illustrating the prior art in the field relating to the present invention.
Figure 9B:
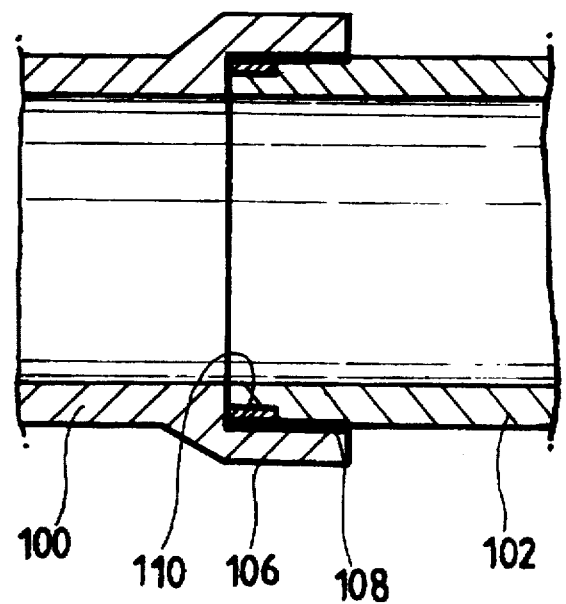

FIGS. 7 and 8 illustrate an assembly for joining pipes in accordance with another preferred embodiment of the present invention.

This third embodiment is characterized in that a channel member as shown in the first embodiment or a crank type member as shown in the second embodiment is omitted.

Instead of using such members, an additional pocket 30 is inserted in a pocket 18 of the watertight device 12.

This additional pocket 30 is longitudinally divided in two halves. This structure prevents the pocket 18 from being shaped cylindrically when the alumina cement powder is poured into the pocket 18.

Also, a single plate material 32 is used in this embodiment for a band of the clip 2, differing from the bands 4 in the first embodiment. The single plate material 32 in this embodiment acts having the same effect as the channel member 20 of the first embodiment.

The additional pocket 30 is formed in a single body with the plate material 32 of the clip 2. Also, the plate material 32 is provided with a binding member 34 to form the plate material 32 in a cylindrical shape around the pipes A and B, to which is necessary i this embodiment due to the lack of a circular channel member 20 as used in the first embodiment.

That is, after wrapping the seal member around the connection of the outer periphery of the concrete pipes A and B as in the first preferred embodiment, the plate material 32 of the clip 2 is placed over the seal member, then both sides of the plate material 32 are temporarily bound together by means of the binding member 34 as shown in FIG. 7.

Next, since alumina cement powder is contained in the additional pocket 30, only a step of pouring water is necessary for expansion. For this, both ends of the plate material 32 are spread apart while both sides of the plate material 32 are kept bound. Therefore, the binding member 34 is fixed on the plate material 32 maintaining somewhat of a distance from both ends of the plate material 32.

The assembly for joining pipes by this third preferred embodiment of the present invention has the advantages of having the same effect as that of the first embodiment, simultaneously achieving simplification in structure and ease of application due to the omission of a metallic channel member or crank type member to be inserted in a pocket, and is additionally easy to use since alumina cement powder is already contained in the pocket.

Therefore, the method for joining pipes and the assembly thereof in accordance with the present invention solves the problem of water leakage in the prior art by completing sealing the connections between pipes when they are joined. Especially in pipes having high water pressure, the present invention can be applied with great effect.

Although a preferred embodiment of the present invention has been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. An assembly for longitudinally joining a pair of pipes, each of said pipes having an end to be joined and a circumferential outside surface, comprising:

a seal member; and a watertight device, said seal member concurrently wrapped about the outside surface of each pipe end to be joined, said watertight device comprised of a first pocket placed over said seal member and adapted to be filled with an alumina cement powder and an additional pocket disposed within said first pocket, said additional pocket formed of a single body longitudinally divided into two halves, each of said halves filled with said alumina cement powder, and a clip for fastening each of said pockets in a circumferential direction about said seal member, said clip bound around an outside of said pocket.

2. The assembly for joining pipes in accordance with claim 1, wherein said pipe ends form a bell and spigot joint wherein said pocket is bent, such that each of said pocket halves corresponds to one respective pipe end.

3. The assembly for joining pipes in accordance with claim 1, wherein the clip comprises a paired-band member.

4. The assembly for joining pipes in accordance with claim 1, wherein said pocket is made of waterproof canvas.

5. The assembly for joining pipes in accordance with claim 3, wherein said paired-band member further includes a binding member, said binding member temporarily binding said clip about said pipes.

6. The assembly for joining pipes in accordance with claim 1, wherein the clip comprises a single plate of a metal material.

7. The assembly for joining pipes in accordance with claim 6, wherein said single plate includes a binding member, said binding member temporarily binding said clip about said pipes.

* * * * *